Figure 1:
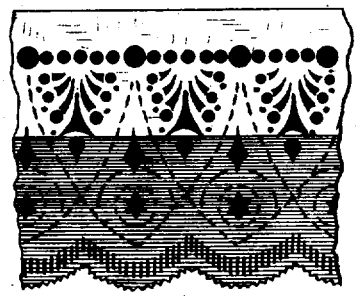

I. J. VAN SKELLINE.

Wrapper for Bon Bons.

No. 9,757. Reissued June 14, 1881.

Witnesses.

P. L. Durand

J. J. McCarthy

Inventor

Isabella J. Van Skelline

By Charles L. Coombs

Attorney

N. PETERS, Photo-Lithographer, Washington, D. C.

UNITED STATES PATENT OFFICE.

ISABELLA J. VAN SKELLINE, OF BROOKLYN, NEW YORK.

WRAPPER FOR BONBONS.

SPECIFICATION forming part of Reissued Letters Patent No. 9,757, dated June 14, 1881.

Original No. 205,448, dated June 25, 1878. Application for reissue filed May 21, 1881.

*To all whom it may concern:*

Be it known that I, ISABELLA J. VAN SKELLINE, of Brooklyn, in the county of Kings and State of New York, have invented certain new and useful Improvements in Wrappers for Bonbons; and I do hereby declare that the following is a full, clear, and exact description thereof, reference being had to the accompanying drawings, and to the letters of reference marked thereon, which form a part of this specification.

My invention relates to certain improvements in wrappers for caramels, bonbons, confections, and the like, and also to linings for boxes of various descriptions.

The invention further relates to an improved method of tinting in various designs on paper, and ornamenting papers for wrapping bonbons, mottoes, comfits, caramels, stick-candy, and for other like purposes, and preserving the tints and forms of the same afterward, as more fully hereinafter specified.

Bonbon-wrappers for the purposes designed have necessarily to be constructed of the thinnest and lightest papers, known in the market as "tissue-paper," in order to produce the proper graceful effect necessary to the production of an article of the proper ornamental nature. As heretofore formed, serious objections have arisen, consequent to the thinness and flimsiness of the sheets, owing to which the papers cannot be made to assume and hold the desired graceful and artistic forms, the articles, after being made, readily assuming a shapeless and confused condition, highly detrimental to the proper ornamental effect.

The object of my invention is to obviate these objections, and to impart to the papers, or certain parts of the same, a boldly-defined form or shape or configuration, and at the same time give sufficient strength and stiffness to such portions as to enable the articles to permanently retain their form under all circumstances; also, to render the articles more flowery, artistic, and highly ornamental in appearance than heretofore.

To this end my invention consists in first imparting to bonbon-wrappers the requisite forms and designs by embossing and tinting such portions in such manner as to form a series of clearly and boldly defined patterns on paper, which designs will greatly enhance the beauty of the ornamental parts. After the embossing, tinting, and dyeing of the paper, I saturate the same with wax or paraffine, so as to render it water-proof, and at the same time heighten the colors and render them more brilliant, thus providing an improved ornamental wrapper for bonbons, caramels, or the like, or a lining for boxes. The papers are then fringed, punctured, scalloped, or corrugated at their edges, so as to give an ornamental or extra-ornamental appearance to the said edges.

Figure 2:
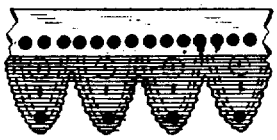
Figure 3:
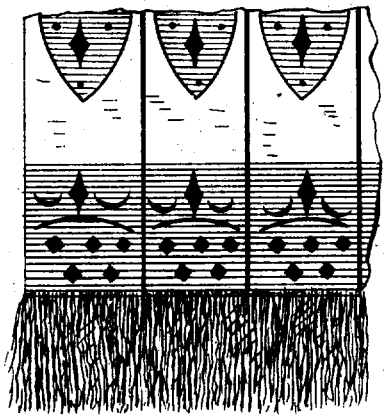
Figure 4:
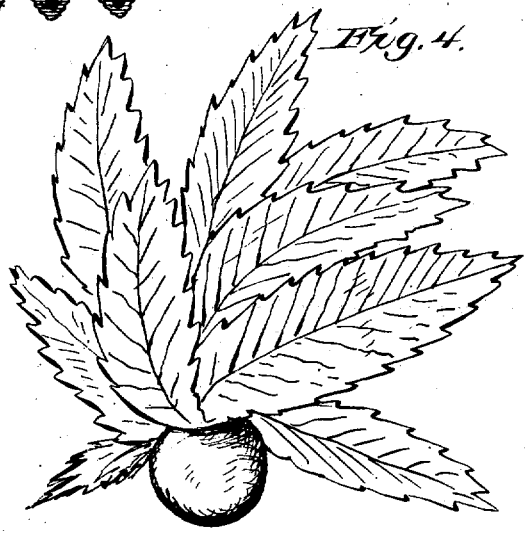

In the drawings, Figure 1 represent one of the forms of my improved sheet of prepared paper. Fig. 2 is a view of another form of the ornamental paper; Fig. 3, another form of the ornamental sheet, showing the edges fringed; and Fig. 4, a view of the sheet formed up into a flower or rose.

In the drawings, the letter A indicates the sheet of paper, which is punctured and ornamented as desired, and then tinted, either superficially or bodily, as may be deemed best. After this the whole sheet is partly or thoroughly saturated with wax, paraffine, or any similar substance that will impart water-proof qualities to the paper and protection to the coloring-matter thereon.

It will be observed that the configuration of the edges of the sheet of paper serves the double purpose of ornamenting it, and at the same time, by reason of the waxy solution to a body that may be made to take and hold any shape desired, which is peculiarly applicable to the manufacture of wrappers for bonbons, or the papers for the same, as more fully hereinafter specified.

Having thus fully described my invention, what I claim, and desire to secure by Letters Patent, is—

1. The method of ornamenting bonbon-wrappers herein described, by first embossing and ornamenting portions thereof, then tinting the same, and finally waxing or saturating the same with wax, paraffine, or other similar substance, substantially as and for the purposes specified.

2. As a new article of manufacture, a sheet of paper having a portion of its body cut, fringed, or punctured and tinted, and the whole saturated with wax, substantially as specified.

3. A sheet of paper having a portion of its body punctured and tinted, and the whole covered with a film of wax, as a new article of manufacture.

In testimony that I claim the foregoing I have hereunto set my hand this 29th day of April, 1881.

I. J. VAN SKELLINE.

Witnesses:
CHAS. L. COOMBS,
E. E. MASSON.